United States Patent
Alleman et al.

(10) Patent No.: US 12,307,031 B2
(45) Date of Patent: May 20, 2025

(54) FINGERTIP PROTECTIVE COVER

(71) Applicant: Hole Opener Corporation International, Lafayette, LA (US)

(72) Inventors: Paden Joseph Alleman, Lafayette, LA (US); Jonathan Adam Moore, Youngsville, LA (US); Richard Allan Moore, Broussard, LA (US)

(73) Assignee: HOLE OPENER CORPORATION INTERNATIONAL, Lafayette, LA (US)

( * ) Notice: Subject to any disclaimer, the term of this patent is extended or adjusted under 35 U.S.C. 154(b) by 0 days.

(21) Appl. No.: 18/025,221

(22) PCT Filed: Sep. 9, 2021

(86) PCT No.: PCT/US2021/049637
§ 371 (c)(1),
(2) Date: Mar. 8, 2023

(87) PCT Pub. No.: WO2022/056109
PCT Pub. Date: Mar. 17, 2022

(65) Prior Publication Data
US 2023/0333678 A1 Oct. 19, 2023

Related U.S. Application Data

(60) Provisional application No. 63/075,895, filed on Sep. 9, 2020.

(51) Int. Cl.
G06F 3/03 (2006.01)
A41D 13/08 (2006.01)
(Continued)

(52) U.S. Cl.
CPC ......... *G06F 3/0393* (2019.05); *A41D 13/087* (2013.01); *G06F 3/0354* (2013.01); *G06F 2203/0331* (2013.01)

(58) Field of Classification Search
CPC ........ G06F 3/044; G06F 3/041; G06F 3/0393; G06F 3/0354; G06F 2203/0331; A41D 13/087
See application file for complete search history.

(56) References Cited

U.S. PATENT DOCUMENTS

| 9,811,179 B2 * | 11/2017 | Escue | G06F 3/03545 |
| 2012/0159683 A1 * | 6/2012 | Jiang | B82Y 30/00 2/69 |
| 2014/0078118 A1 * | 3/2014 | Robb | A41D 13/087 345/179 |

* cited by examiner

*Primary Examiner* — Michael A Faragalla
(74) *Attorney, Agent, or Firm* — LAW OFFICE OF JESSE D. LAMBERT, LLC

(57) ABSTRACT

A fingertip protective cover to reduce transmission of germs, viruses and the like when a person's fingertip contacts a touchscreen, such as are used on many electronic devices. A dome shaped main body has a convex top surface, adapted for contact with touchscreen contact points. A bottom surface has a concave recess for receiving a portion of a human fingertip. At least the recess of the fingertip protective cover is sufficiently self-adhesive to releasably adhere to the fingertip in use, or alternatively an adhesive is disposed in the recess. The top surface is electrically conductive to permit use with electrically conductive (capacitive) touchscreens. The entirety of the fingertip protective cover may be formed of an electrically conductive material, or alternatively the top surface may be covered with a layer of electrically conductive material.

7 Claims, 9 Drawing Sheets

(51) Int. Cl.
*G06F 3/0354* (2013.01)
*G06F 3/039* (2013.01)

FINGERTIP PROTECTIVE COVER

CROSS REFERENCE TO RELATED APPLICATIONS

This non-provisional United States Patent application claims priority to U.S. provisional patent application Ser. No. 63/075,895, filed Sep. 9, 2020, for all purposes. The disclosure of that provisional patent application is incorporated herein by reference, to the extent not inconsistent with this disclosure.

BACKGROUND—FIELD OF THE INVENTION

This invention relates to protective covers for human fingertips, to prevent the spread of germs, viruses and the like arising from fingertip contact with touchscreens associated with electronic devices.

As is well known, many types of electronic devices have touchscreens, on which distinct spots or locations, commonly called "buttons," are touched in order to enter data, select alpha numeric characters, etc. Some touchscreens are resistive touchscreens, which recognize touch commands using pressure. Many touchscreens, however, are capacitive touchscreens, which require the use of an input device capable of conducting electricity. The human body is electrically conductive, therefore the touch of a bare human fingertip will activate capacitive touchscreens. An issue arises when a protective fingertip cover is desired to be used, in order to prevent the spread of germs, viruses and the like arising out of fingertip contact with a touchscreen. As can be readily understood, any such protective fingertip cover must be electrically conductive to enable use with a capacitive touchscreen.

BRIEF DESCRIPTION OF THE DRAWINGS

FIG. 7 is a top view of the fingertip protective cover.

FIG. 8 is a cross section view of the fingertip protective cover of FIG. 7, along the section lines shown in FIG. 7.

FIGS. 9 and 10 are top and bottom perspective views of the embodiment of FIG. 7.

FIG. 11 is a cross section view of two fingertip protective covers as in FIG. 7, stacked one atop the other.

DESCRIPTION OF THE PRESENTLY PREFERRED EMBODIMENT(S)

Figure 1:
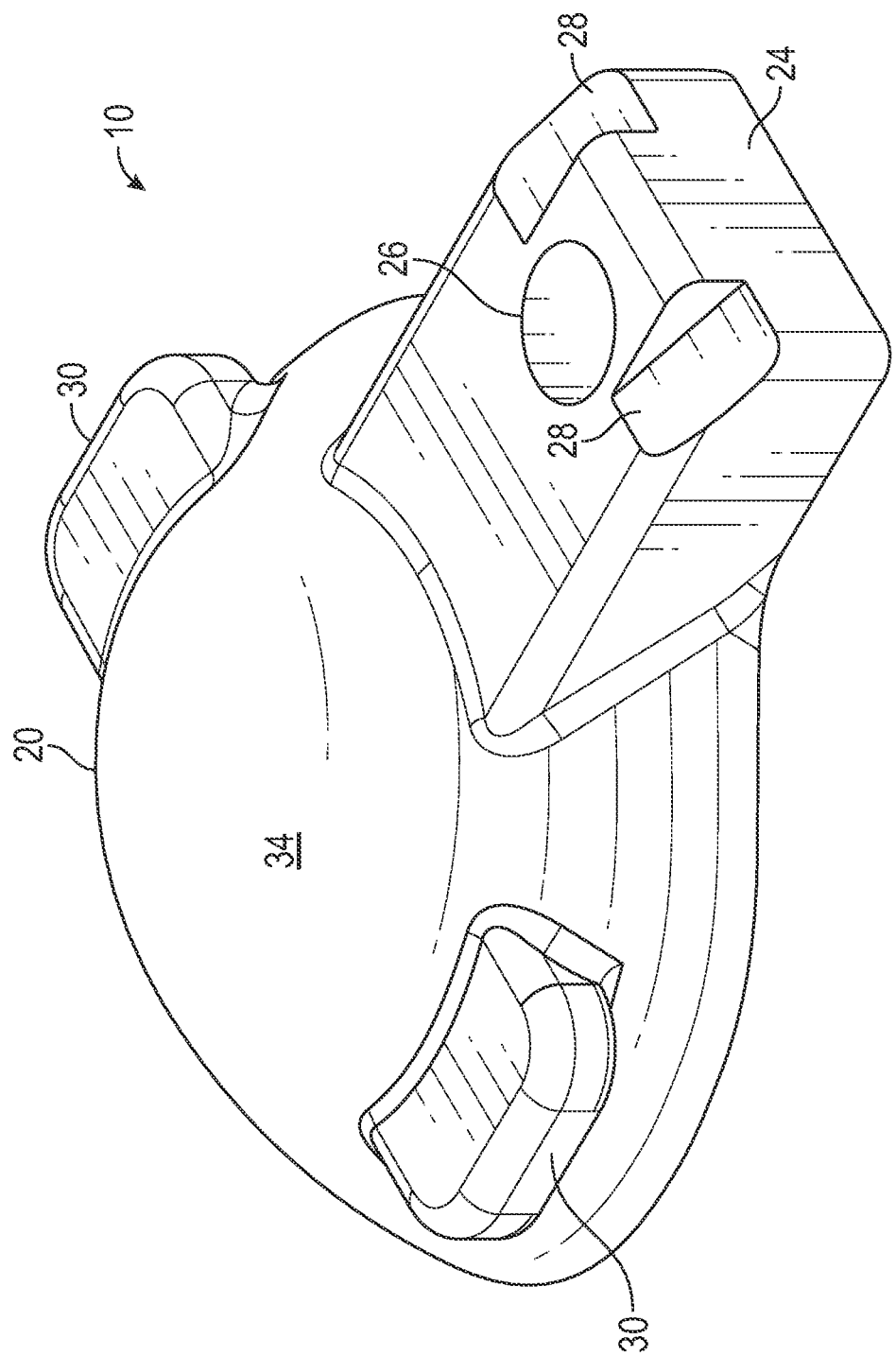
FIG. 1 is a top perspective view of one embodiment of a fingertip protective cover embodying the principles of the present invention.

While various fingertip protective covers can embody the principles of the present invention, with reference to the drawings some of the presently preferred embodiments can be described.

A First Embodiment

With reference to FIGS. 1-6, a first embodiment of the fingertip protective cover can be described. Fingertip protective cover 10 is preferably made of an electrically conductive material (or that at least has a conductive layer) that can be releasably attached to a person's fingertip (see FIG. 6 for an exemplary placement on a fingertip). Fingertip protective cover 10, along with an accompanying dispenser and method of use, provides an inexpensive and highly distributable method for customers to safely interact with touchscreens on merchant processor card terminal/kiosk buttons and touchscreens during the check-out process, at retail and/or grocery stores, while ordering at restaurants or similar vendors, and/or ATM cash withdrawals.

Fingertip protective cover 10 comprises a dome shaped main body 20, and may be formed by injection molding, press formed, stamped, or similar methods known in the relevant art. Main body 20 comprises a convex top surface 34 and a bottom surface 36. Main body 20, including its various structural elements as described, may be integrally formed (for example, by injection molding) from a number of different materials, and may be made totally of a conductive material or have a conductive layer over at least top surface 34. Suitable materials include but are not limited to thermoplastics of many sorts, high density polyethylene (HDPE), and other suitable materials that lend themselves to injection molding or other suitable manufacturing processes. By way of further example, top surface 34 may be of a conductive metal, such as copper, which has known antibacterial properties; the entirety of main body 20 may be of a conductive polymer or other material, or of a metal such as copper; a conductive coating may be applied to a base polymer or other material or metal material; or a non-conductive base material may be used with a conductive material mixed therein, during the manufacturing process. For example, a suitable percentage of copper (in the form of powder or similar small pieces) could be mixed with a non-conductive base material, and the resulting mixture used in an injection molding process to fabricate fingertip protective cover 10.

With reference to the drawings, fingertip protective cover 10 comprises several structural attributes, preferably all integrally formed, which contribute to use in a vending machine or the like, and to use of the apparatus by a user. Fingertip protective cover 10 comprises a dispensing tab 24 to facilitate use in a dispenser, and to also serve as a release that allows a user to remove it from a finger without touching any potentially contaminated surfaces. Preferably, fingertip protective cover 10 comprises a recess or hole 26 in dispensing tab 24 that assists in the dispensing process, for example via a touchless dispenser.

Figure 3:
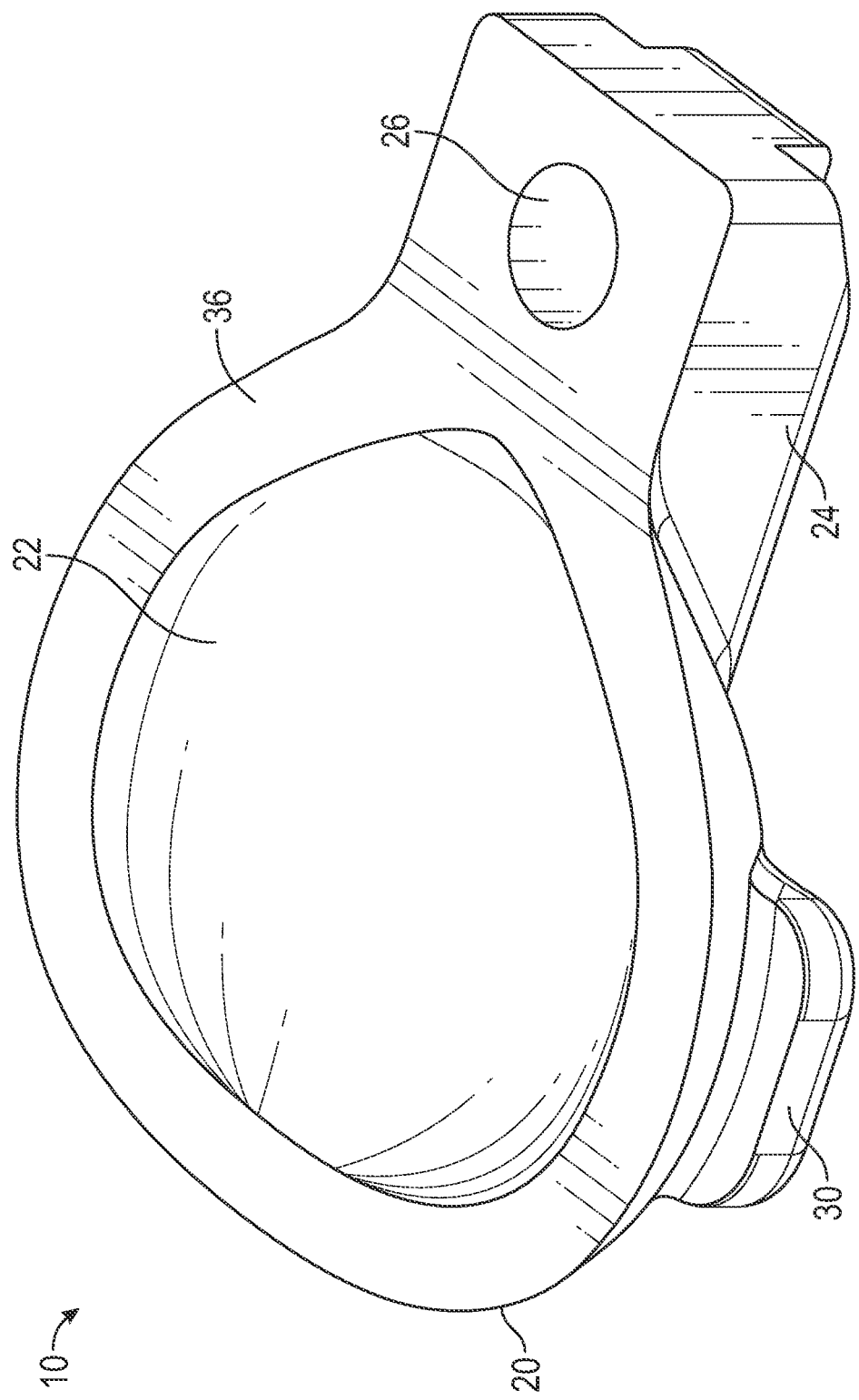
FIG. 3 is a bottom perspective view of the fingertip protective cover.
Figure 4:
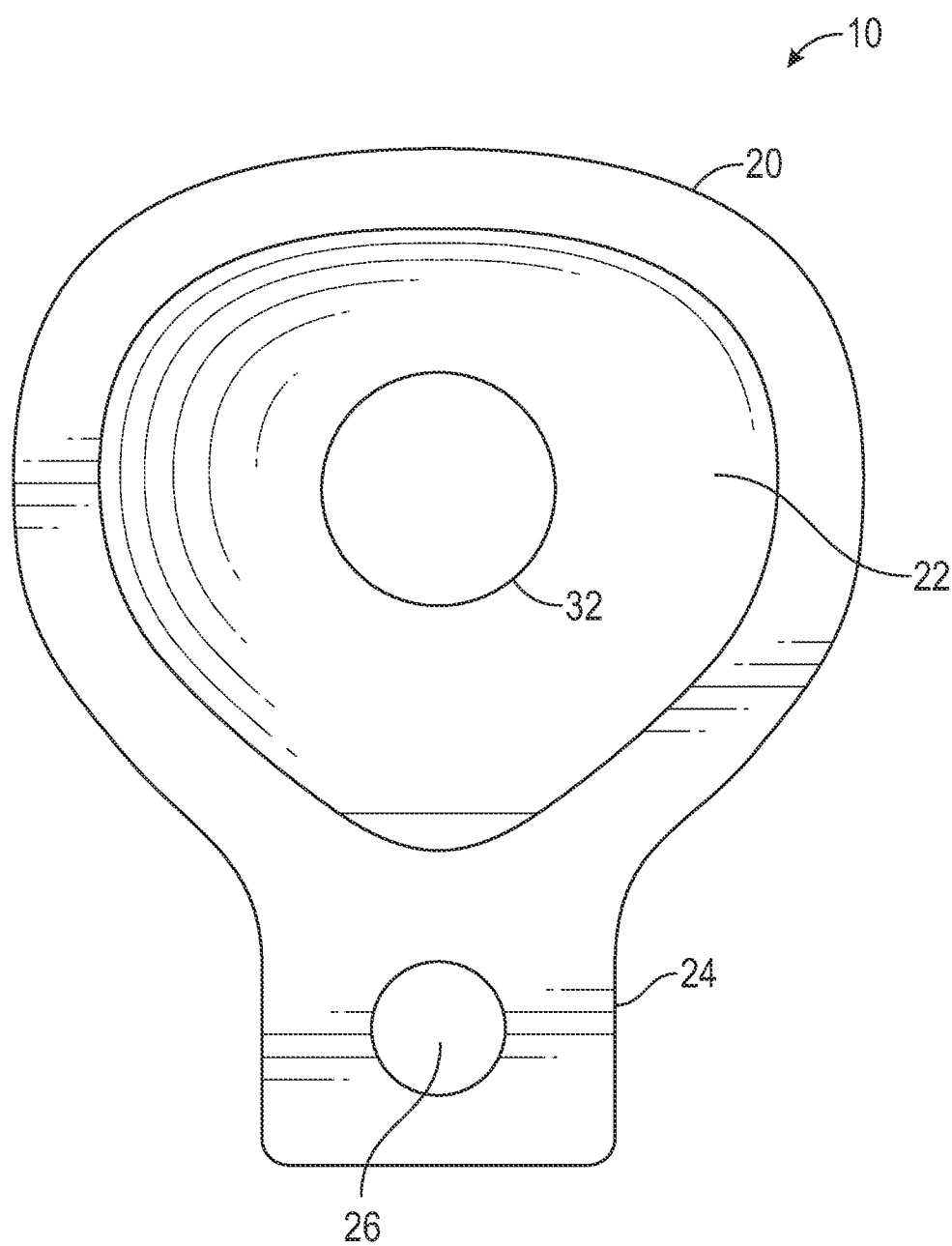
FIG. 4 is a bottom view of the fingertip protective cover.
Figure 6:
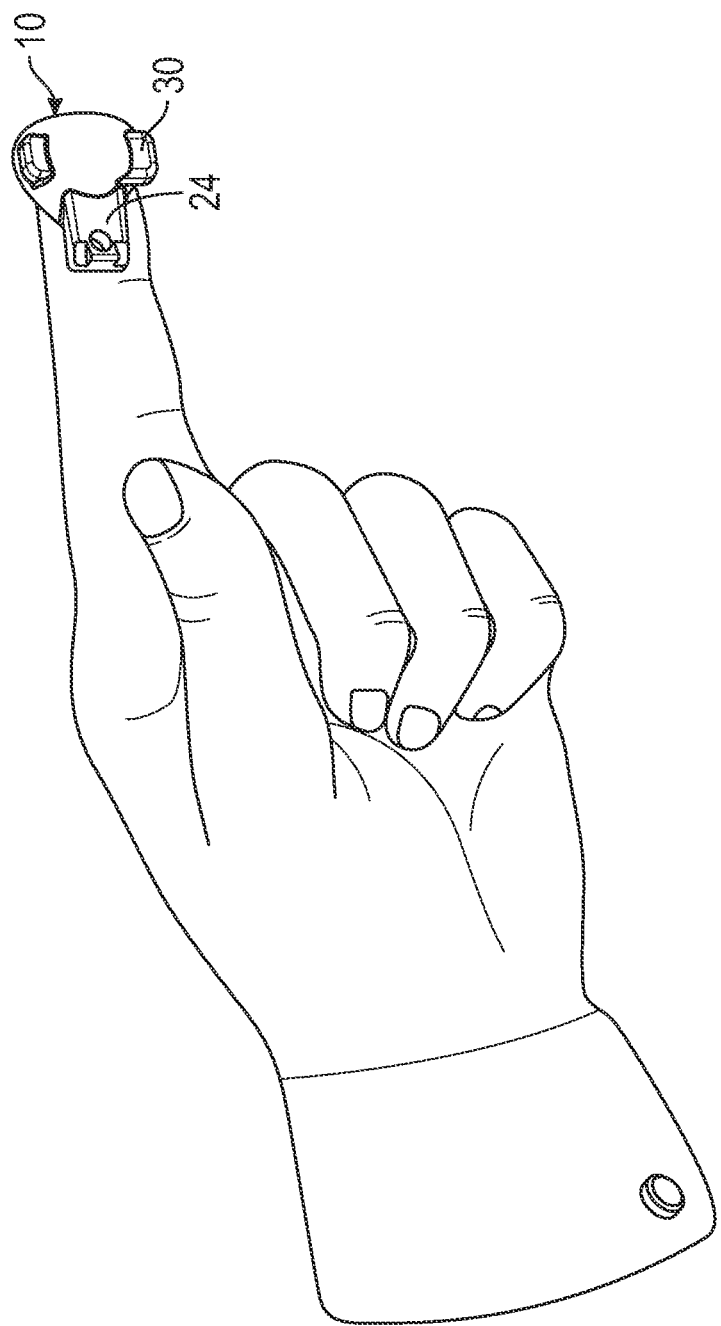
FIG. 6 shows the fingertip protective cover in place on a human finger.
Figure 7:
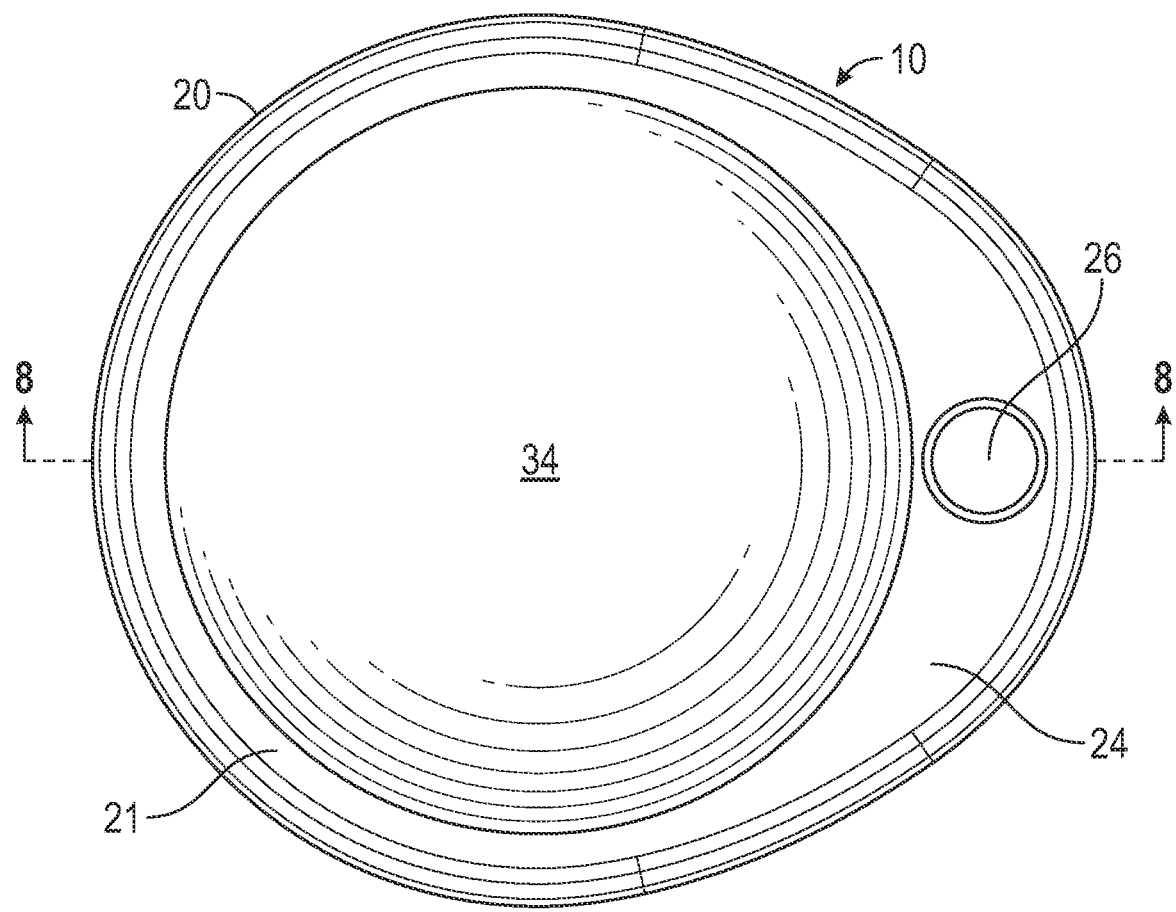
FIGS. 7-11 show an alternative second embodiment of the fingertip protective cover.
Figure 8:
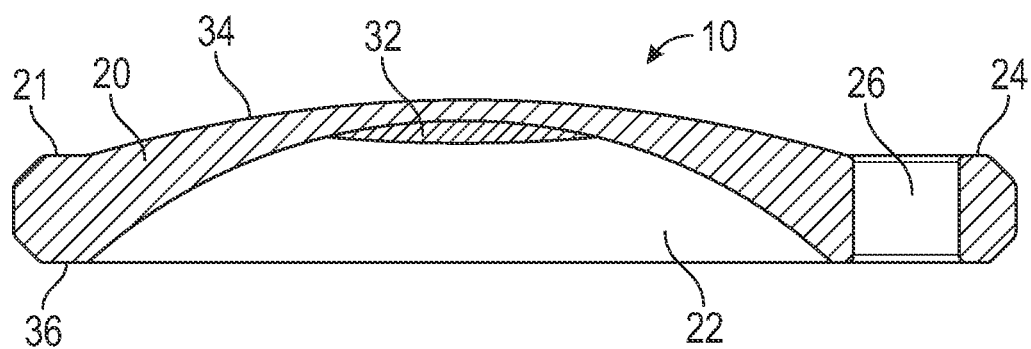
Figure 9:
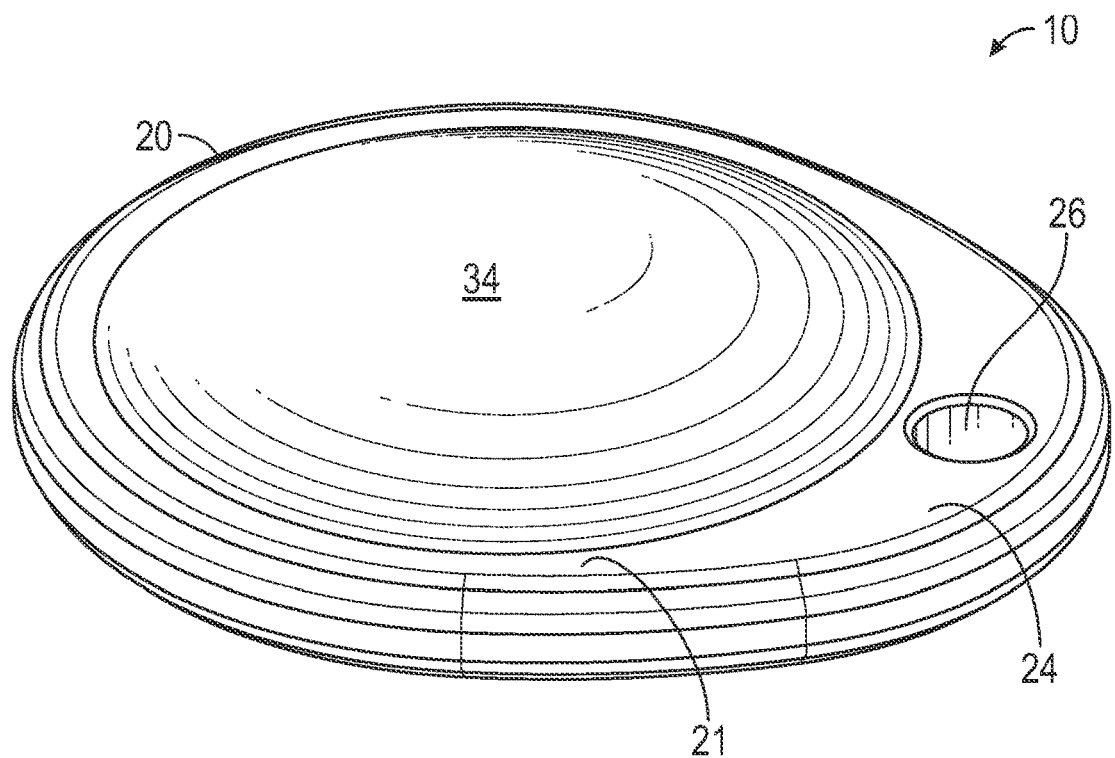
Figure 10:
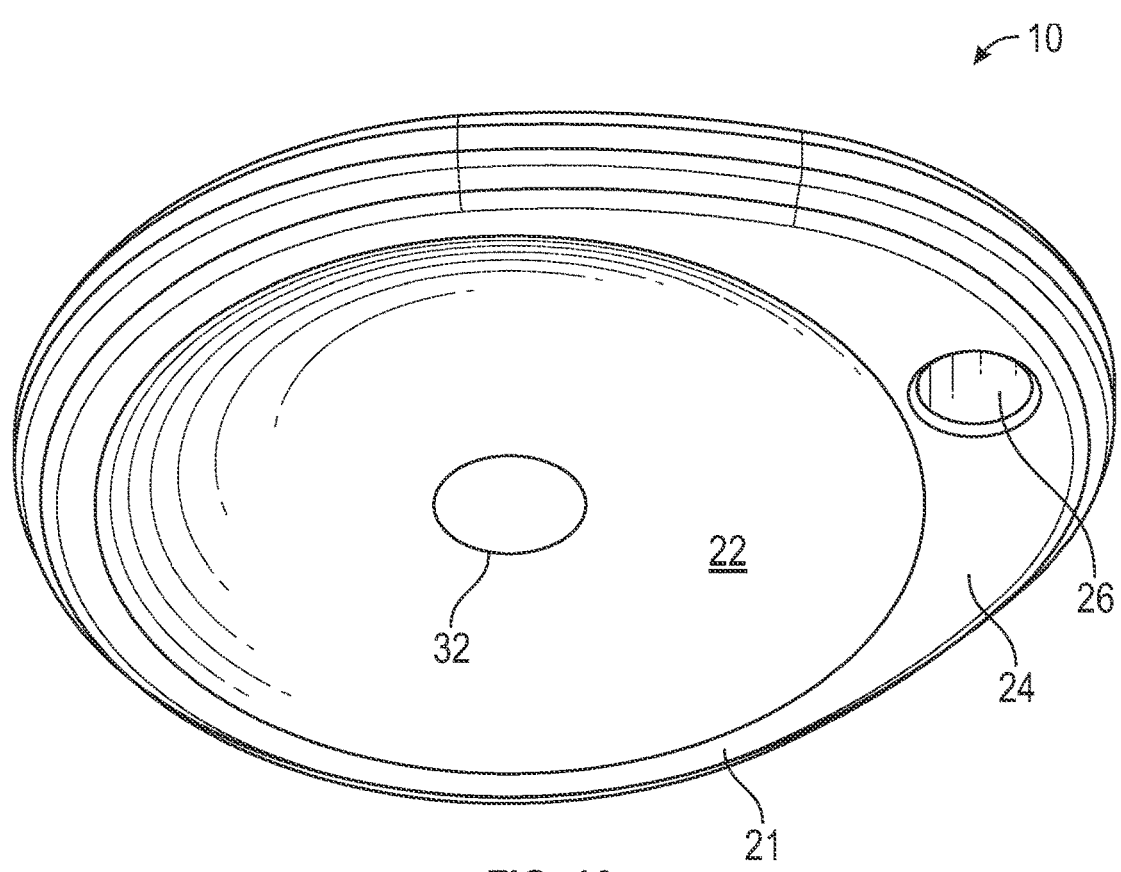

A concave recess 22 in bottom surface 36 is sized and shaped to receive a portion of a human fingertip, as can be seen in FIG. 6. Recess 22 is designed with an angled concavity that accommodates a broad range of finger sizes, as can be seen in FIGS. 3 and 4. Preferably, fingertip protective cover 10 is formed from a material with a certain degree of ductility, which will aid in conforming to the fingertip size, especially for larger fingertips.

As can be understood, fingertip protective cover 10 in a preferred embodiment releasably attaches to a human fingertip as needed to position fingertip protective cover 10 as needed and contact a touchscreen. In one embodiment, fingertip protective cover 10 is formed from a material that has a sufficient degree of adhesion. In another embodiment, as shown in FIG. 4, a suitable amount of adhesive 32, noted as a glue pool, is disposed in recess 22 to provide adhesion to a human fingertip. Preferably, adhesive 32 comprises an FDA approved skin glue forming the glue pool during the manufacturing process, that adheres the apparatus to a human fingertip. Adhesive 32 in the form of a glue pool is shaped and positioned opposite the conductive portion of the radius of top surface 34, to maintain a minimum clearance while stacked within a dispenser, see FIG. 5.

Figure 5:
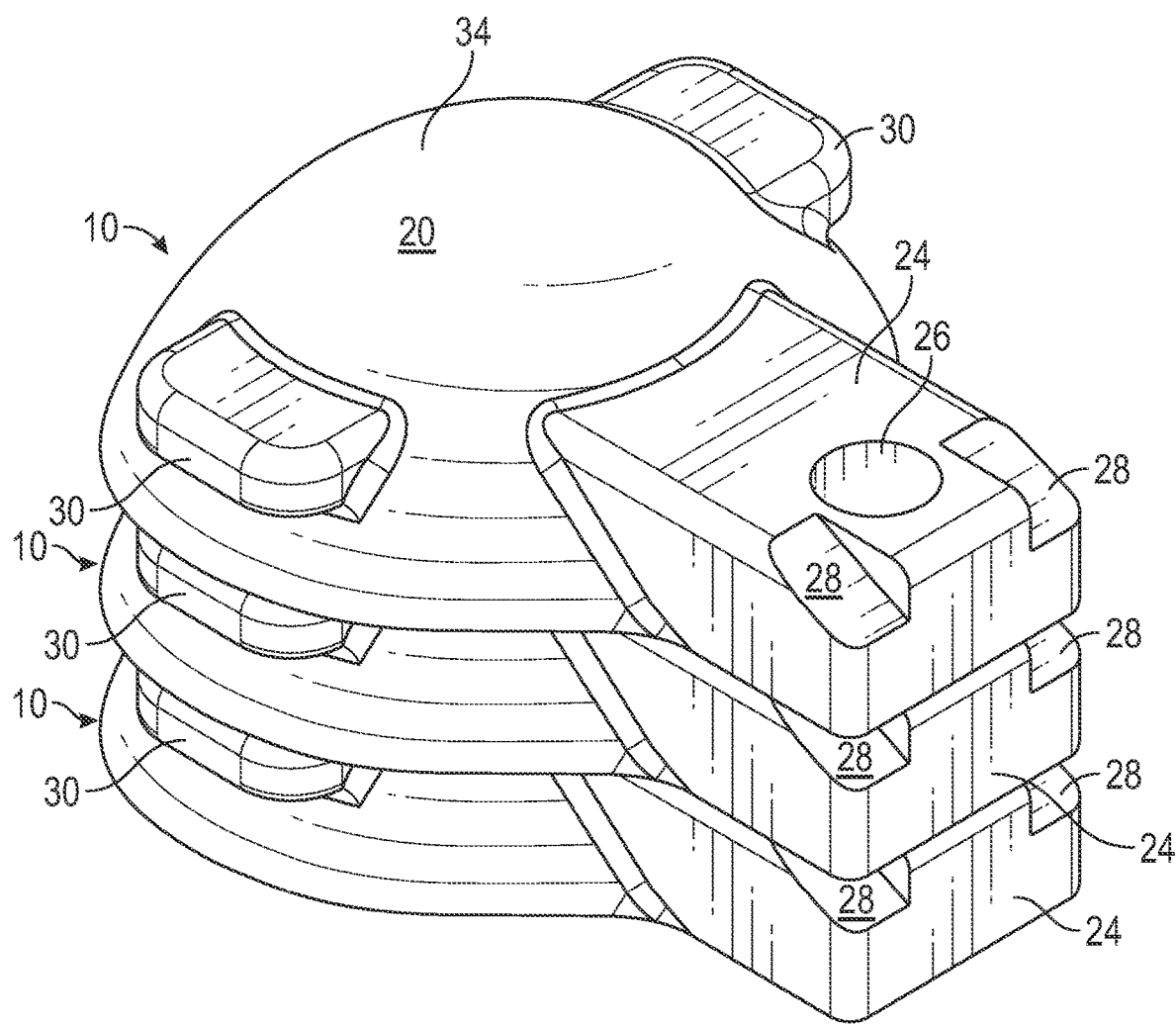
FIG. 5 shows a plurality of fingertip protective covers, nested together as in a dispensing device.

Other structural attributes assist in the dispensing process. Separation chamfers 28 on dispensing tab 24 are, in one possible embodiment of a vending device or dispenser, used by a indexing fork within the dispenser to separate and dispense one fingertip protective cover 10 from the stack within the dispenser at a time, see especially FIGS. 1 and 5. Spacer tabs 30 keep adjacent fingertip protective covers 10 appropriately spaced and top surface 34 prevented from compressing into adhesive 32 of adjacent protective covers 10 while stacked, again as can be seen in FIGS. 1 and 5.

Figure 2:
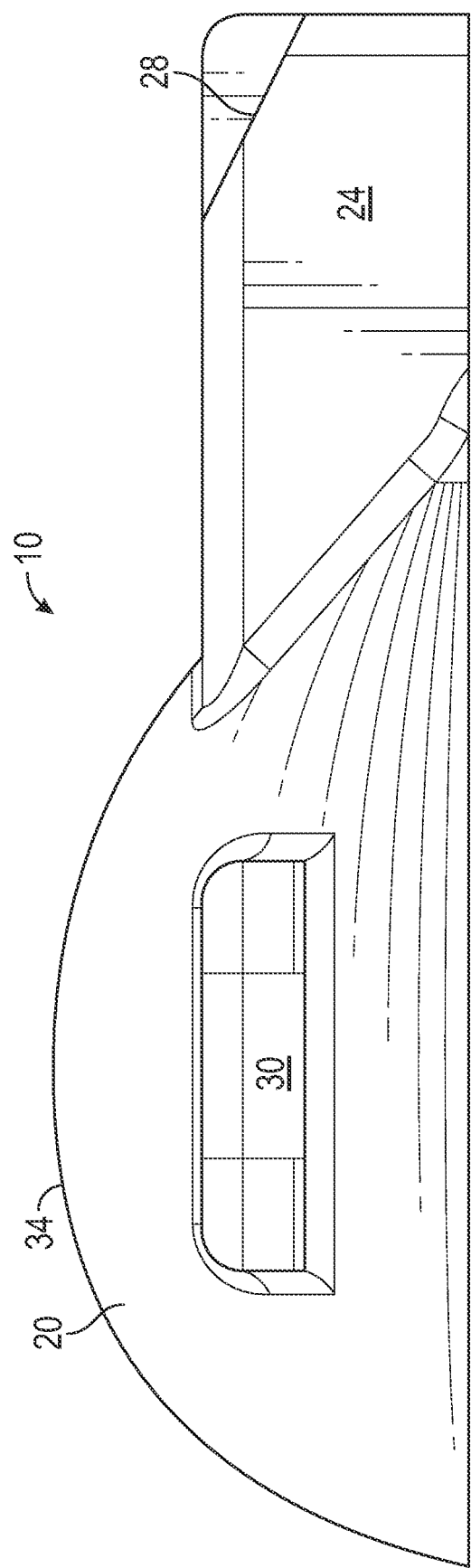
FIG. 2 is a side view of the fingertip protective cover of FIG. 1.

The convex top surface 34 is shaped so as to assist the user to accurately align a fingertip touch, preferably giving the user a pin point like signature contact point, with the screen surface, see especially FIG. 2.

It is envisioned that fingertip protective cover 10 may be distributed or dispensed in a plurality of different manners. Two presently preferred manners include:

(1) Commercial distribution, via an electric mechanical touchless dispenser than will run on inline (or stand alone) power with the merchant processor card terminal/kiosk.

(2) Personal (non-commercial) distribution, via a dispensing tube with mechanical spring means to present a new fingertip protective cover 10 for each use from a column of stacked fingertip protective covers.

In both the commercial and personal distribution systems, dispensing tab 24 serves as an alignment element within the dispensers to maintain proper alignment of fingertip protective cover 10.

A Second Embodiment

With reference to FIGS. 7-10, a second embodiment of the fingertip protective cover can be described. The second embodiment shares many structural characteristics with the first embodiment; the same element numerals are used where possible.

Figure 11:
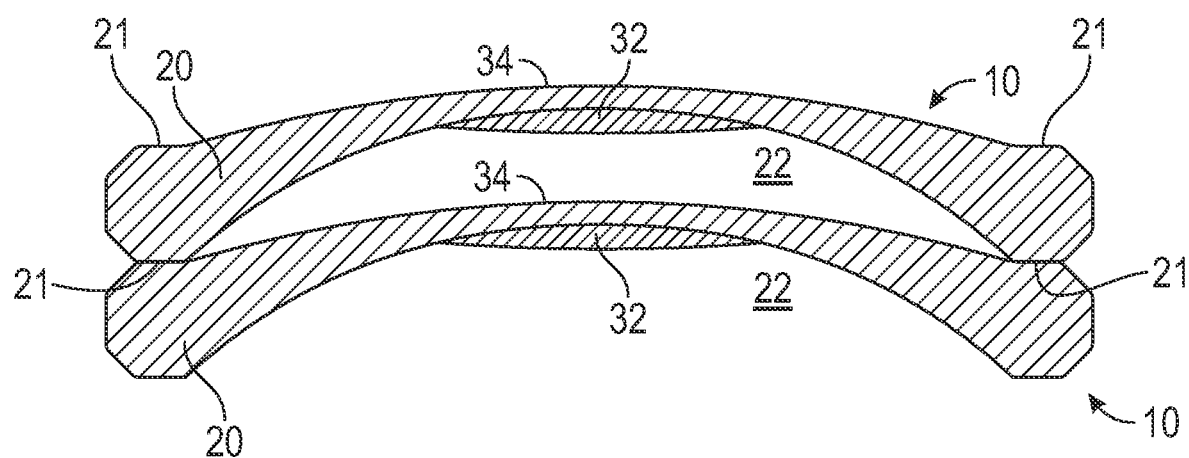

This second possible embodiment of fingertip protective cover 10 comprises main body 20, with a convex top surface 34 and a concave bottom surface 36. Top surface 34 is convex, so as to provide a surface for point contact on a touchscreen, as described above. Bottom surface 36 comprises a recess 22, sized and shaped to accommodate a portion of a human fingertip. Dispensing tab 24 is more nearly formed from an extension of a rim 21 surrounding main body 20. Adhesive 32 may be provided in recess 22. Spacing between adjacent fingertip protective covers 10, for example when in a dispenser, is provided by the cross sectional shape of top surface 34 and recess 22, which are preferably of different degrees of curvature. In addition, as can be seen in FIG. 11, the dimension of rim 21 is a factor in spacing of fingertip protective covers 10 when stacked upon one another. As can be readily seen in FIG. 11, the combination of the dimensions of rim 21 and the different degrees of curvature of top surface 34, and recess 22, form a space sufficient for placement of adhesive 32 in recess 22 while preventing contact of top surface 34 of the lower fingertip protective cover 10 with adhesive 32, and permits some lateral movement of adjacent fingertip protective covers 10 without disturbing adhesive 32. Guide recess or hole 26 is preferably provided in dispensing tab 24.

Materials and method of manufacture may be as described above in connection with the first embodiment. An electrically conductive top surface 34 is provided, either by the material forming fingertip protective cover 10 being conductive, by a conductive layer over top surface 34, or a conductive material being mixed into the base material for fingertip protective cover 10.

Material; Method of Manufacture; Use

As described above, suitable materials include most materials amenable to molding, such as injection molding, which include but are not limited to thermoplastics of all forms, HDPE, etc. An electrically conductive layer may be placed over top surface 34. Alternatively the entirety of the apparatus may be formed from copper or other metal, by means known in the art. Alternatively a conductive material, such as powdered copper, may be mixed into a thermoplastic.

Suitable methods of manufacture include those known in the relevant art, including but not limited to injection molding, machining, combinations thereof, etc.

To use the apparatus, fingertip protective cover 10 is releasably adhered to a human fingertip, as shown in FIG. 6; thereafter, top surface 34 is pressed against a touchscreen (whether capacitive or resistive), in a desired location, to select a desired digital device function, alphanumeric symbol, etc. After use, fingertip protective cover 10 may be discarded, to reduce the possibility of transmission of germs, viruses, etc.

CONCLUSION

While the preceding description contains specificities, it is to be understood that same are presented only to describe some of the presently preferred embodiments of the invention, and not by way of limitation. Changes can be made to various aspects of the invention, without departing from the scope thereof.

Therefore, the scope of the invention is to be determined not by the illustrative examples set forth above, but by the appended claims and their legal equivalents.

We claim:

1. A fingertip protective cover, comprising:
   a dome shaped main body comprising a top surface and a bottom surface, said top surface comprising a convex shape, said bottom surface comprising a concave recess sized and shaped to receive a portion of a human fingertip, further comprising an adhesive disposed in said recess, said adhesive adapted to hold said fingertip protective cover to a fingertip;
   and wherein:
   said top surface comprises an electrically conductive material;
   further comprising a dispensing tab extending from said main body, and spacer tabs disposed on said main body and extending radially outward therefrom, wherein said spacer tabs limit movement of said top surface of a first fingertip protective cover into said recess of said bottom surface of a second fingertip protective cover, when said second fingertip protective cover is positioned against said first fingertip protective cover;
   wherein said dispensing tab further comprises a guide recess comprising a concave opening in a lower surface of said dispensing tab; and
   said fingertip protective cover is adapted to releasably adhere to said human fingertip inserted into said recess, to permit activation of a touchscreen of an electronic device by contact of said top surface with said touchscreen.

2. The fingertip protective cover of claim 1, wherein said main body is integrally formed from an electrically conductive material.

3. The fingertip protective cover of claim 2, wherein said main body is formed from an adhesive material.

4. The fingertip protective cover of claim 2, wherein said main body is integrally formed by injection molding from a composite of electrically conductive material and non-electrically conductive material.

5. The fingertip protective cover of claim 4, wherein said electrically conductive material comprises copper.

6. The fingertip protective cover of claim 1, wherein said top surface and said recess comprise different degrees of curvature.

7. The fingertip protective cover of claim 6, whereby when two fingertip protective covers are stacked one atop another, a gap is formed between said top surface of a lower fingertip protective cover and a surface of said recess, sufficient to avoid contact between said top surface and an adhesive disposed in said recess.

\* \* \* \* \*